United States Patent [19]
Karg

[11] Patent Number: 5,957,149
[45] Date of Patent: Sep. 28, 1999

[54] FLUID DIVERTER VALVE

[76] Inventor: Jeffrey A. Karg, 2 Whitehall La., Hopkinton, Mass. 01748

[21] Appl. No.: 09/102,684

[22] Filed: Jun. 23, 1998

Related U.S. Application Data

[60] Provisional application No. 60/050,770, Jun. 25, 1997.

[51] Int. Cl.$^6$ ............................................. F16K 11/044
[52] U.S. Cl. ............................ 137/119.04; 137/119.08; 137/872
[58] Field of Search .................... 137/119.01, 119.03, 137/119.04, 119.08, 119.1, 872

[56] References Cited

U.S. PATENT DOCUMENTS

| | | | |
|---|---|---|---|
| 2,169,043 | 8/1939 | Goehring | 137/872 |
| 2,893,416 | 7/1959 | Hegstad | 137/119 |
| 3,495,611 | 2/1970 | Topfer et al. | 137/119.01 |
| 3,614,965 | 10/1971 | Metivier | 137/119 |
| 3,722,525 | 3/1973 | Epple | 137/119.01 |
| 3,785,403 | 1/1974 | Kirk | 137/608 |
| 4,153,078 | 5/1979 | Yamazaki et al. | 137/882 |
| 4,381,795 | 5/1983 | Power et al. | 137/240 |
| 5,141,016 | 8/1992 | Nowicki | 137/872 |
| 5,273,075 | 12/1993 | Skaer | 137/883 |
| 5,492,149 | 2/1996 | Loschelder et al. | 137/625 |
| 5,573,186 | 11/1996 | Loschelder | 239/445 |
| 5,605,173 | 2/1997 | Arnaud | 137/7 |
| 5,607,038 | 3/1997 | Lorriette | 192/85 |
| 5,622,203 | 4/1997 | Givier et al. | 137/337 |
| 5,699,832 | 12/1997 | Burchard et al. | 137/614.2 |
| 5,744,033 | 4/1998 | Bertrand et al. | 210/282 |

FOREIGN PATENT DOCUMENTS

| | | |
|---|---|---|
| 0 266 838 | 5/1988 | European Pat. Off. . |
| 2.110.571 | 5/1972 | France . |
| 1.604.915 | 6/1972 | France . |
| 10-89537 | of 1998 | Japan . |

*Primary Examiner*—Stephen M. Hepperle
*Attorney, Agent, or Firm*—Marshall, O'Toole, Gerstein, Murray & Borun

[57] ABSTRACT

A fluid diverter valve for selectively switching fluid flow between two paths is disclosed. The valve includes an intake port, two output ports, and a valve member mounted for reciprocating movement between a first position wherein fluid is substantially prevented from flowing through the first output port, and a second position wherein fluid is substantially prevented from flowing through the second output port. The valve includes two switches. Actuating one of the switches causes the valve member to move from the first position to the second position. Actuating the other switch causes the valve member to move from the second position to the first position. The disclosed valve acts as an integral diverter valve and vacuum break.

38 Claims, 4 Drawing Sheets

FLUID DIVERTER VALVE

RELATED APPLICATIONS

This application claims priority from prior U.S. provisional application Ser. No. 60/050,770 which was filed on Jun. 25, 1997 and which is incorporated herein in its entirety by reference.

FIELD OF THE INVENTION

The invention relates generally to valves, and, more particularly, to a fluid diverter valve for selectively switching fluid flow between two paths.

BACKGROUND OF THE INVENTION

Prior art valves for diverting fluid flow between two paths are known in the art. However, such valves suffer from certain disadvantages. For example, such prior art valves typically include a handle or other mechanical actuator which is attached in some way to the fluid diverting element. This circumstance is disadvantageous in that it restricts the valve to a particular mode of actuation (e.g., if the diverting element is moved to block a fluid path by rotating a knob, that valve can only be actuated by rotating the knob). It is also disadvantageous in that it introduces additional moving elements into the device which require maintenance and are prone to failure.

In addition, in many applications it is essential to provide a vacuum break. Prior art diverter valves do not provide such a break. Instead, if a vacuum break is desired in an application employing a prior art diverter valve, a separate vacuum break element must be installed. The inclusion of additional elements to achieve a vacuum break is disadvantageous in that it raises costs for the application both at the installation and construction phase, and at the maintenance stage over the service life of the application in question.

SUMMARY OF THE INVENTION

In accordance with an aspect of the invention, a fluid diverter valve is provided. The diverter valve comprises a housing defining a chamber; an intake port; a first output port in communication with the chamber; a second output port in communication with the chamber; and a valve member having a first sealing surface and a second sealing surface. The valve member is disposed within the chamber for reciprocating movement between a first position wherein the first sealing surface substantially prevents fluid from flowing through the first output port, and a second position wherein the second sealing surface substantially prevents fluid from flowing through the second output port. The diverter valve is also provided with a first channel in communication with the chamber and the intake port for delivering fluid from the intake port to a first side of the valve member adjacent the first sealing surface; and a second channel in communication with the chamber and the intake port for delivering fluid from the intake port to a second side of the valve member adjacent the second sealing surface. In addition, the diverter valve includes a first switch located adjacent to the intake port for selectively limiting fluid flow into the intake port; and a second switch located for selectively limiting fluid flow from the intake port to the second side of the valve member without limiting fluid from flowing to the first side of the valve member.

In some embodiments, the valve member comprises a disk. In some embodiments, the valve member comprises a flexible diaphragm.

In some embodiments, the valve member is provided with a spring located within the chamber in operative engagement with the valve member for biasing the valve member towards the first position. The spring moves the valve member from the second position to the first position when the first switch is actuated to limit fluid flow into the intake port.

In any of the foregoing embodiments, the first switch may optionally limit fluid flow by partally preventing fluid flow for a predetermined time period, and/or the first switch may optionally limit fluid flow by completely preventing fluid flow for a predetermined time period.

In some embodiments, a first fluid path is open when the valve member is in the first position; wherein the first fluid path is defined by the intake port, the second channel, at least a portion of the chamber, and the second output port.

In some embodiments, a second fluid path is open when the valve member is in the second position; wherein the second fluid path is defined by the intake port, the first channel, at least a portion of the chamber, and the first output port.

In some embodiments, when the valve member is in the first position, closing the second switch causes pressure developed by fluid delivered to the first side of the valve member to move the valve member from the first position to the second position such that fluid flows from the intake port to the first output port.

In any of the foregoing embodiments, the valve may act as an integral diverter valve and vacuum break wherein (a) if a vacuum of sufficient magnitude is applied to the first output port, the valve member moves from the first position to the second position regardless of the position of the switches, and (b) if a vacuum of sufficient magnitude is applied to the second output port, the valve member moves from the second position to the first position, regardless of the position of the switches.

In accordance with another aspect of the invention, a fluid diverter valve is provided. The fluid diverter valve comprises: a housing defining a chamber; an intake port; a first output port in communication with the chamber; a second output port in communication with the chamber; and a valve member. The valve member is disposed within the chamber for reciprocating movement between a first position wherein the valve member substantially prevents fluid from flowing through the first output port, and a second position wherein the valve member substantially prevents fluid from flowing through the second output port. The diverter valve also includes a first switch for selectively limiting fluid flow from the intake port to a first side of the valve member without limiting fluid flow to a second side of the valve member; and a second switch located for selectively limiting fluid flow from the intake port to the second side of the valve member without limiting fluid from flowing to the first side of the valve member. Closing the second switch causes the valve member to move from the first position to the second position, and closing the first switch causes the valve member to move from the second position to the first position.

In accordance with another aspect of the invention, an integral fluid diverter valve and vacuum break is provided. The apparatus includes a housing defining a chamber; an intake port; a first output port in communication with the chamber; and a second output port in communication with the chamber. It also includes a valve member disposed within the chamber for reciprocating movement between a first position wherein the valve member substantially prevents fluid from flowing through the first output port, and a second position wherein the valve member substantially prevents fluid from flowing through the second output port. The valve member moves in response to dynamic pressure differentials caused by flow restriction such that (a) fluid flow through a first opening in the chamber to move from the first position to the second position; (b) to the application of a vacuum having a magnitude greater than a first threshold to the second output port to move from the first position to the second position; (c) to fluid flow through a second opening in the chamber to move from the second position to the first position; and (d) to the application of a vacuum having a magnitude greater than a second threshold to the first output port to move from the second position to the first position.

In some embodiments, the first threshold is different from the second threshold. In other embodiments, the first threshold is the same as the second threshold.

In accordance with another aspect of the invention, another fluid diverter valve is provided. The valve includes a housing defining a chamber; an intake port; a first output port in communication with the chamber; and a second output port in communication with the chamber. It also includes a valve member which is isolated from engagement with elements external to the housing. The valve member is disposed within the chamber for reciprocating movement between a first position wherein the valve member substantially prevents fluid from flowing through the first output port, and a second position wherein the valve member substantially prevents fluid from flowing through the second output port.

Other features and advantages are inherent in the apparatus claimed and disclosed or will become apparent to those skilled in the art from the following detailed description and its accompanying drawings.

DESCRIPTION OF THE PREFERRED EMBODIMENTS

Figure 1:
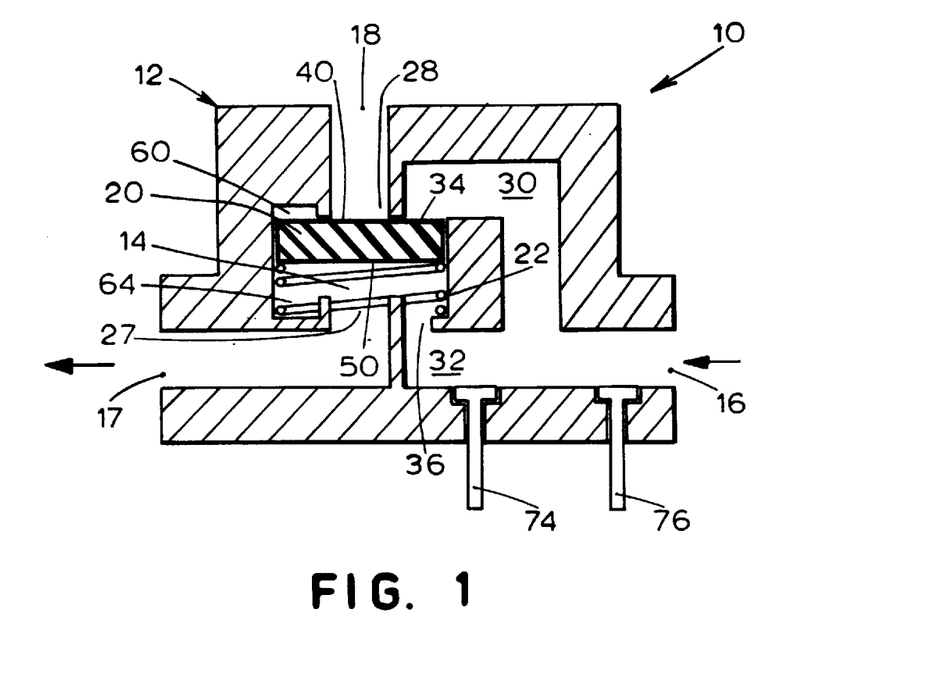
FIG. 1 is a schematic illustration of a fluid diverter valve constructed in accordance with the teachings of the instant invention and shown in a first open state.

A fluid diverter valve 10 constructed in accordance with the teachings of the invention and capable of switching fluid flow between two paths is schematically illustrated in cross-section in FIG. 1. As used herein the term "fluid" refers to both liquids and gases. Thus, the disclosed valve, 10 is adapted for use with both liquids and gases and can be used in any application where flow control and/or fluid diversion is desired.

As shown in FIG. 1, the valve 10 is provided with a housing 12 defining a chamber 14. For the purpose of controlling fluid flow through the housing 12 and its chamber 14, the housing 12 defines three ports, namely an intake port 16, and two output ports 17, 18. All three of these ports 16, 17 and 18 are in communication with the chamber 14. In particular, output port 17 is in communication with an opening 27 into the chamber 14, and the output port 18 is in communication with an opening 28 into the chamber 14. The intake port 16 is in communication with two channels 30, 32 which are, in turn, in respective communication with two separate openings 34, 36 into the chamber 14.

In order to control the flow of fluid through the housing 12 and, thus, through chamber 14, the valve 10 is provided with a valve member 20 disposed within the chamber 14. As shown in FIG. 1, the valve member 20 may optionally be implemented as a disk with one side of the disk being disposed adjacent the opening 28 and the opposite side of the disk being disposed adjacent the opening 27. However, as explained in more detail below in connection with the discussion of FIG. 5, in the presently preferred embodiment, the valve member 20 is implemented by a flexible diaphragm.

As shown in FIG. 1, one side of the valve member 20 forms a sealing surface 40 for selectively substantially preventing fluid flow through the opening 28. The other side of the valve member 20 forms another sealing surface 50 for selectively substantially preventing fluid flow through the opening 27. The valve member 20 is disposed within the chamber 14 for reciprocating movement between a first position wherein sealing surface 40 prevents fluid from flowing through opening 28 and output port 18 (see FIG. 1), and a second position wherein sealing surface 50 prevents fluid from flowing through opening 27 and output port 17 (see FIG. 3). The valve member 20 may be implemented by a material such as plastic, stainless steel, brass, rubber or any combination thereof.

For the purpose of biasing the valve member 20 towards the first position, the valve 10 is provided with a spring 22. As shown in FIG. 1, the spring 22 is preferably implemented as a coil spring seated within the chamber 14 between the lower wall of the chamber 14 and the lower sealing surface 50 of the valve member 20. As explained in further detail below, the spring 22 ensures that the valve member 20 is located in the first position unless displaced by fluid pressure sufficient to compress spring 22.

As shown in FIG. 1, the two channels 30, 32 and the two openings 36, 34 mentioned above are located for respectively delivering fluid from the intake port 16 to the sealing surfaces 40, 50 of the valve member 20. Specifically, channel 30 delivers fluid from the intake port 16 through the opening 34 to the sealing surface 40 and channel 32 delivers fluid from the intake port 16 through the opening 36 to sealing surface 50. To ensure the fluid transported by channel 30 applies pressure to an area of the sealing surface 40 which is sufficiently large to overcome the spring force of spring 22 when the valve member 20 is in the first position, the opening 34 is preferably in communication with an annular chamber 60 disposed above and in communication with the chamber 14. Similarly, to ensure a more even application of fluid pressure to the sealing surface 50 when the valve member is in the second position, the opening 36 is preferably in communication with an annular chamber 64 disposed below and in communication with the chamber 14.

In order to selectively direct fluid flow through the housing 12, the valve 10 is provided with two switches 74, 76. The first switch 76 is located adjacent the intake port 16 for selectively limiting fluid flow into the intake port 16 from an external source. The second switch 74 is located adjacent the end of the channel 32 nearest the intake port 16 for selectively limiting fluid flow from the intake port 16 to the sealing surface 50 of the valve member 20 without limiting fluid flow to the sealing surface 40. As explained below, the switches 74, 76 are utilized to control the position of the valve member 20.

For example, when no or little fluid is supplied to the intake port 16, the force of spring 22 biases the valve member 20 into the first position shown in FIG. 1. If fluid is then applied through the intake port 16 with both switches 74, 76 in the open position shown in FIG. 1, fluid is delivered through both channels 30, 32 to both sealing surfaces 40, 50. Since the area of sealing surface 50 exposed to fluid pressure is larger than the area of sealing surface 40 exposed to such pressure (no pressure is applied to the area of sealing surface 40 adjacent opening 28), the fluid pressure against sealing surface 50 combines with the spring force of spring 22 to maintain the valve member 20 in the first position. Thus, fluid is prevented from flowing through output port 18, and fluid flows through a fluid path defined by the intake port 16, channel 32, the lower portion of chamber 14 and the output port 17.

Figure 2:
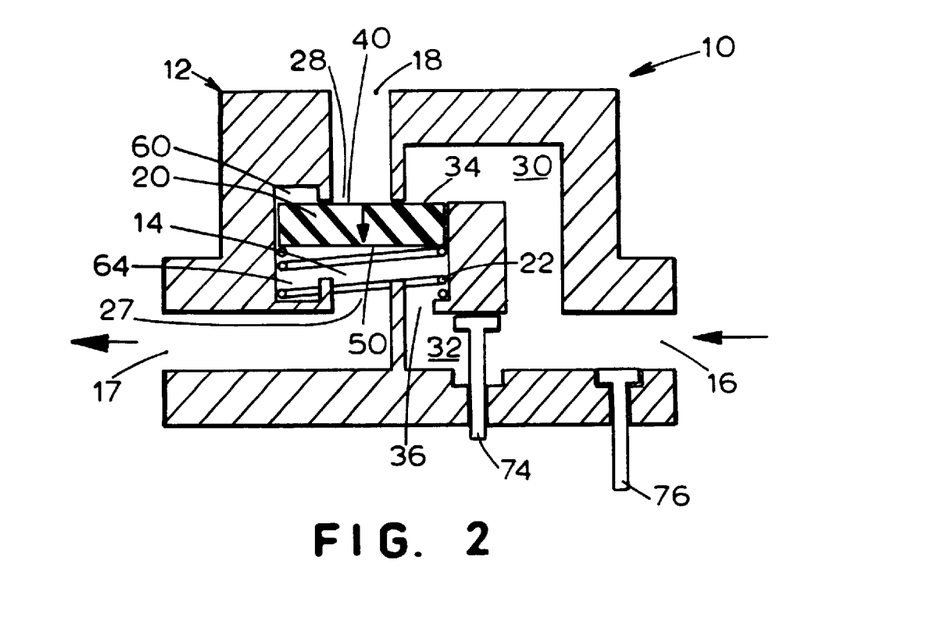
FIG. 2 is a schematic illustration similar to FIG. 1 but showing the valve in a first intermediate state between first and second open states.
Figure 3:
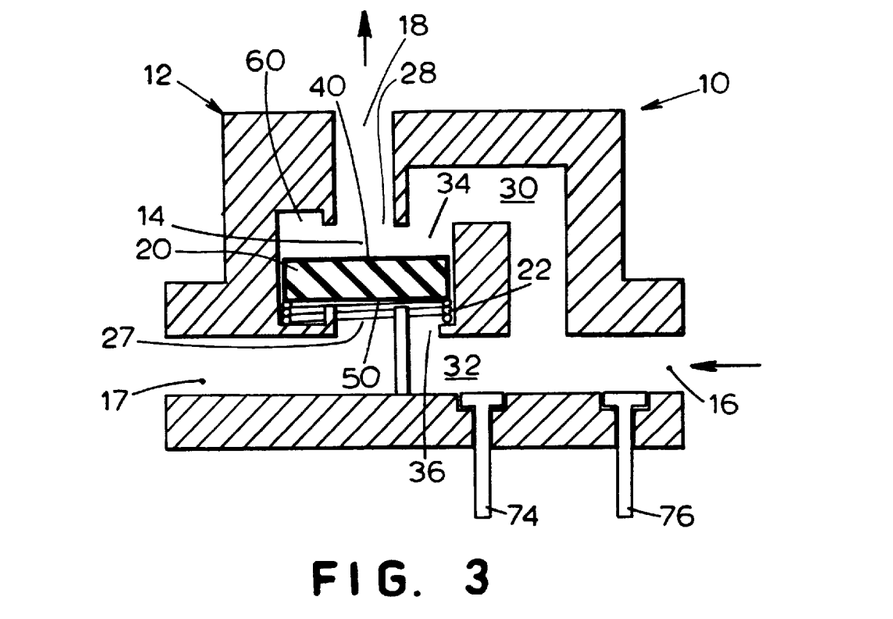
FIG. 3 is a schematic illustration similar to FIG. 1 but showing the valve in a second open state.

If switch 74 is closed when the valve member 20 is in the first position, the fluid entering the intake port 16 will be diverted through channel 30 to sealing surface 40. Preferably, a reduced amount of fluid will reach sealing surface 50 from the intake port 16 after switch 74 is closed. If sufficient fluid pressure is applied to the intake port 16, the fluid pressure delivered to the sealing surface 40 will be sufficient to overcome the force generated by the spring 22. As a result, the valve member 20 will move from the first position into the second position (see FIGS. 2 and 3). In other words, closing switch 74 as shown in FIG. 2, causes pressure developed by the fluid delivered to the sealing surface 40 to move the valve member 20 from the first position to the second position such that fluid flows from the intake port 16 to the output port 18. As shown in FIG. 3, when the valve member 20 is in the second position, fluid is preferably prevented from flowing through the output port 17, and fluid flows through a path defined by the intake port 16, the channel 30, the top portion of the chamber 14, and the output port 18.

As shown in FIG. 3, if the switch 74 is opened with the valve member 20 in the second position, the valve member 20 will not move. The valve member 20 remains seated in sealing engagement with opening 27 because, as shown in FIG. 3, the entire area of the sealing surface 40 is exposed to fluid pressure whereas only the area of the sealing surface 50 adjacent the annular chamber 64 is exposed to fluid pressure. No fluid pressure is applied to the sealing surface 50 adjacent opening 27. This pressure imbalance prevents the valve member 20 from moving from the second position. Since the force of the spring 22 always acts to bias the valve member 20 towards the first position, the spring 22 should be chosen, and the annular chamber 64 should be dimensioned, such that the pressure imbalance is not overcome by the spring force.

Persons of ordinary skill in the art will appreciate that, in embodiments implementing the valve member 20 as a disk, some leakage may occur between the outer diameter of the disk and the inner surface of the chamber 14. Such leakage reduces the pressure differential created across the valve member 20 by changing the state of the switches 74, 76 and, thus, reduces the sensitivity of the diverter valve 10 to switch state changes. Persons of ordinary skill in the art will also appreciate that, since the switches 74, 76 are intended to leak (i.e., to only partially limit flow), the force applied to move the valve member 20 from the first position to the second position (and to hold the valve member 20 in the position shown in FIG. 3) is equal to the pressure applied to surface 40 multiplied with the area of the opening 27. Thus, the area of the opening 27 and the spring 22 must be chosen such that the applied fluid pressure multiplied with the area of opening 27 is greater than the force applied by spring 22. Of course, gravity and other incidental forces should be considered when making these selections.

Figure 4:
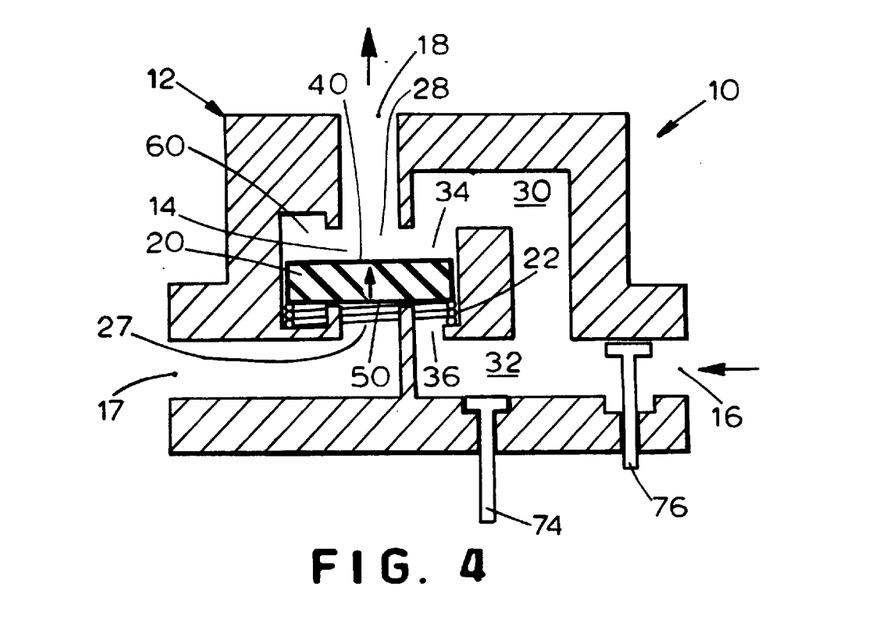
FIG. 4 is a schematic illustration similar to FIG. 2 but showing the valve in a second intermediate state.

Closing the switch 76 releases the valve member 20 from the second position. More specifically as shown in FIG. 4, when the switch 76 is closed, fluid flow is substantially reduced to the valve member 20. As a result, the pressure imbalance discussed above is removed, and the primary force still acting on the valve member 20 is the force generated by the spring 22. Thus, spring 22 moves the valve member 20 from the second position to the first position (see FIG. 1) when switch 76 is actuated to limit fluid flow into the intake port 16 from an external source.

Although in the illustrated embodiment, closing the switch 74 only partially reduces fluid flow through channel 32, and closing switch 76 only partially limits fluid from entering the valve 10 via the intake port 16, persons of ordinary skill in the art will readily appreciate that one or more of the switches 74, 76 can be implemented to completely or partially prevent fluid flow either momentarily or indefinitely without departing from the scope or spirit of the invention. Persons of ordinary skill in the art will also appreciate that, although for ease of explanation, positional terms such as "upper", "lower", "upwards", and "downwards" have been used to describe the illustrated embodiment, neither the disclosed valve 10 nor the teachings of the invention are in any way limited to any particular orientation of use. Indeed, valves 10 constructed in accordance with the teachings of the invention can preferably be employed in any spatial orientation without departing from the scope or spirit of the invention.

Persons of ordinary skill in the art will appreciate that, although the valve 10 shown in FIGS. 1–4 employs a spring 22 to bias the valve member 20 into a default position (i.e., the position shown in FIG. 1), the spring 22 can be eliminated without departing from the scope or spirit of the invention. If the spring is eliminated in the embodiment shown in FIGS. 1–4, the default position of the valve member will be somewhere in the middle of the chamber 14 such that fluid simultaneously flows through both output ports 17, 18.

Figure 5:
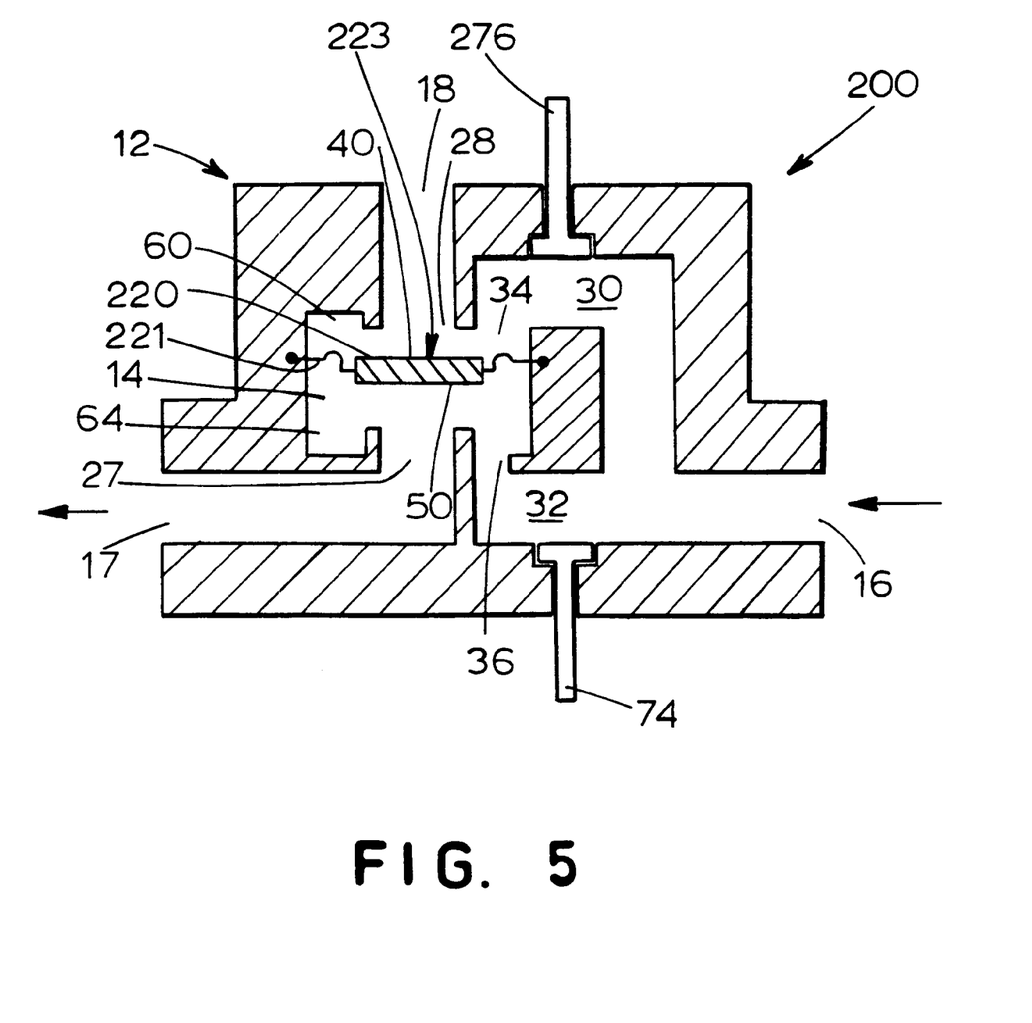
FIG. 5 is a schematic illustration of another fluid diverter valve constructed in accordance with the teachings of the invention.

Another valve 200 constructed in accordance with the teachings of the invention is shown in FIG. 5. The valve 200 includes many of the same parts as the valve 10 described in connection with FIGS. 1–4. In the interest of brevity, the description of those common parts will not be repeated here. Instead, the interested reader is referred back to the above description for an enabling description of those parts. To facilitate this process, like reference numerals have been used to refer to like parts in FIGS. 1–4 and FIG. 5.

Turning to FIG. 5, the valve 200 differs from the valve 10 discussed in connection with FIGS. 1–4 in that its valve member 220 is implemented by a flexible diaphragm 221 which is mounted within the chamber 14 and which supports a disk 223 for reciprocating movement therein. Preferably, the diaphragm 221 is sized to form a sealing barrier between an upper portion of chamber 14 and a lower portion of chamber 14. Also, the disk 223 is preferably sized to have approximately the same circumference as the seats defining the opposed openings 27 and 28. The valve member 220 of FIG. 5 is preferred to the valve member 20 shown in FIGS. 1–4, because the diaphragm 221 eliminates the leakage problems associated with the valve member 20 discussed above in connection with the descriptions of FIGS. 1–4. In particular, the use of a flexible diaphragm 221 eliminates the leakage around the outer circumference of the disk of FIGS. 1–4, and, thus, does not suffer from the reduced pressure differential and reduced sensitivity to switch state changes associated with such leakage.

In the preferred embodiment, the housing 12 comprises a lower portion and an upper portion which are secured together during use. Preferably, the diaphragm 221 is secured between the two portions of the housing. Also the diaphragm 221 may pass through the center of the disk 223 and the disk 223 may comprise two pieces, one secured to each side of the diaphragm 221, or, the disk 223 may be molded into and surrounded by the diaphragm 221. Alternatively, the diaphragm 221 and the disk 223 may be integrally formed from one material.

Although in the illustrated embodiment, the diaphragm 221 is used to create an improved seal between the upper and lower portions of the chamber 14, persons of ordinary skill in the art will appreciate that other means of creating seals may be employed. For example, in embodiments employing a disk as valve member 20, sealing rings, molded fins, or the like can be positioned on the outer diameter of the disk to create a seal without departing from the scope or spirit of the invention.

The valve 200 also differs from the valve 10 in that the spring 22 has been eliminated. In the valve 200, the flexible diaphragm 221 is constructed of an elastomeric material such as rubber or silicon such that applying sufficient pressure to one of the sealing surfaces 40, 50 of the valve member 20 causes the diaphragm 221 to stretch and the disk 223 to move into sealing engagement with either opening 27 or opening 28. Removal of the applied pressure permits the diaphragm 221 to return to its at rest position (see FIG. 5). In short, the flexible diaphragm 221 assumes the function of the eliminated spring 22.

As will be appreciated by persons of ordinary skill in the art, the valve member 220 may be located at any desired position within the chamber 20. For example, the valve member 220 can be positioned such that it creates a seal with respect to one of the openings 27, 28 when it is in its at rest position. Alternatively, the valve member 220 can be constructed such that, in its at rest position, fluid flow is permitted through both openings 27, 28 as shown in FIG. 5.

The valve 200 also differs from the valve 10 in that the switch 76 has been eliminated and in that the switch 276 has been added. As shown in FIG. 5, the switch 276 is located for selectively limiting fluid flow from the intake port 16 to sealing surface 40 of the valve member 220 without limiting fluid flow to sealing surface 50 of the valve member 220. Thus, by closing switch 276, fluid flow from the intake port 16 to surface 40 of the valve member 220 will be substantially eliminated, and the valve member 200 will move into sealing engagement with the seat defining the opening 28. As no fluid pressure will typically be present at opening 28 after such sealing, the switch 276 can be returned to the open position shown in FIG. 5 and the valve member 220 will remain in sealing engagement with the seat adjacent opening 28 despite the elastomeric force generated by the diaphragm 24. If switch 74 is then closed, the fluid flowing through channel 30 will cause the valve member 220 to move away from opening 28 through the chamber 14 and into sealing engagement with the seal defining the opening 27. The valve member 220 can, thus, be selectively moved back and forth through the chamber by opening and closing the switches 74, 276 as described above. If desired, both switches 74, 276 can be closed at the same time to return the valve member 220 to its at rest position (see FIG. 5).

Figure 6:
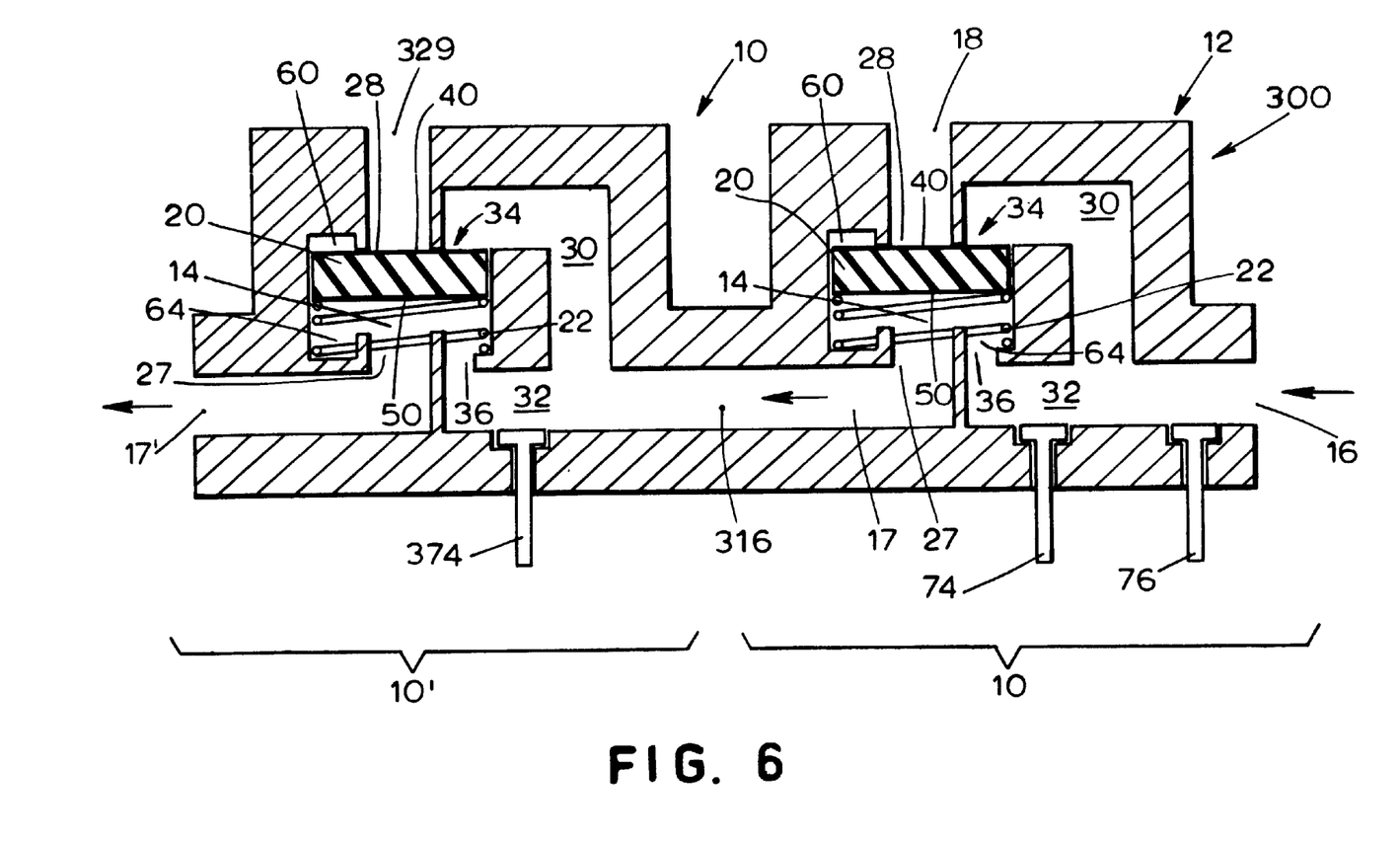
FIG. 6 is a schematic illustration showing two diverter valves constructed in accordance with the teachings of the invention connected in series.

An alternative valve 300 constructed in accordance with the teachings of the invention is shown in FIG. 6. The valve 300 is constructed of parts which are substantially identical to the parts described above in connection with FIGS. 1–4. In the interest of brevity, descriptions of those parts will not be repeated here. Instead, the interested reader is referred to the above description of the valve 10 shown in FIGS. 1–4 for an enabling description of the parts shown in FIG. 6. To facilitate this process, like reference numerals have been used to refer to like parts in FIGS. 1–4 and FIG. 6.

The valve 300 substantially comprises two valves 10, 10' similar to valve 10 connected in series. As shown in FIG. 6, the output port 17 of the first valve 10 is connected to the intake port 116 of the second valve 10'. The second valve 10' includes only one switch 374. A second switch is not needed in the second valve 10' because closing switch 76 of the first valve 10 returns both valve members 20 to their first positions (shown in FIG. 8).

As shown in FIG. 6, the valve 300 includes three output ports 17', 18, 329. In the initial state, fluid passes through intake port 16, through the first valve 10, into intake port 316, and out through output port 17' of the valve 10'. If switch 74 is closed, the valve member 20 of the valve 10 moves to its second position and fluid flow is diverted away from valve 10' and out of output port 18. Closing switch 76 of valve 10 returns the valve member 20 of the valve 10 to its first position as explained above.

If, with the valve member 20 of the valve 10 in its first position, switch 374 is closed, the valve member 20 of the valve 10' is forced from its first position to its second position such that fluid flows through the valve 10, into the intake port 316 of valve 10' and out of output port 329. Closing switch 76 greatly reduces all fluid flow to valves 10, 10'. As a result, the force of the spring 22 returns the valve member 20 of the valve 10' to its first position (see FIG. 6).

From the foregoing, persons of ordinary skill in the art will appreciate that the valve 300 provides a mechanism for switching fluid flow between three separate paths. Persons of ordinary skill in the art will further appreciate that additional output ports can be added by connecting additional valves 10' in series or in parallel with valve 300. Moreover, persons of ordinary skill in the art will appreciate that one or more additional valves 10' (or one or more chains of valves 10') could also be connected to output port 18, output port 329, and/or output port 17', without departing from the scope or spirit of the invention. Further configurations are also possible. For example, the output port 18 of a first valve 10 can be connected to an output port 18 of a second valve 10 to create more complex hydraulic valving mechanisms without departing from the scope or spirit of the invention. In addition, one or more of the valves 200 can be combined with one or more other valves 10, 200, 300 to create additional other valving mechanisms. By way of one example, valves 10, 10' could optionally be replaced by valves 200 in FIG. 6 without departing from the scope of the invention.

Persons of ordinary skill in the art will appreciate that switches 74, 76 and 374, can be optionally spring biased if desired. Persons of ordinary skill in the art will further appreciate that all switches should preferably be returned to their open positions before attempting to change the state of the valves 10, 200, 300.

Finally, persons of ordinary skill in the art will appreciate that diverter valves that controllably divert fluid between two paths without requiring a user to physically contact the diverting element (i.e., valve member 20, 220) either directly or indirectly (i.e., via a handle or other mechanical actuator) has been provided. In particular, the valve members 20, 220 of the disclosed devices are is isolated from physical contact with elements external to the housing 12.

As will be appreciated, the disclosed diverter valves act as both fluid diverters and as vacuum breaks. Specifically, if a vacuum having a magnitude greater than a threshold value is created at either one of the output ports 17, 18, the valve member 20, 220 will be pulled against the corresponding opening 27, 28 to prevent fluid flow towards the vacuum regardless of the state of the switches 74, 76, 276. (The thresholds required may optionally be the same or different for the two output ports 17, 18 depending on the strength of the spring 22 or the elastomeric properties and location of the diaphragm 221). Thus, the disclosed valves act as integral fluid diverters and vacuum breaks.

Persons of ordinary skill in the art will also appreciate that the low tolerance requirements of the disclosed valves 10, 200 make them easily manufacturable.

Although certain instantiations of the teachings of the invention have been described herein, the scope of coverage of this patent is not limited thereto. On the contrary, this patent covers all instantiations of the teachings of the invention fairly falling within the scope of the appended claims either literally or under the doctrine of equivalents.

What is claimed is:

1. A fluid diverter valve comprising:
   a housing defining a chamber;
   an intake port;
   a first output port in communication with the chamber;
   a second output port in communication with the chamber, the second output port being located in substantial alignment with the first output port, the first and second output ports being centrally located on opposite sides of the chamber;
   a valve member having a first sealing surface and a second sealing surface, the valve member being disposed within the chamber for reciprocating movement between a first position wherein the first sealing surface substantially prevents fluid from flowing through the first output port, and a second position wherein the second sealing surface substantially prevents fluid from flowing through the second output port, the valve member having a center, the first and second output ports being disposed in substantial alignment with the center of the valve member;
   a first channel in communication with the chamber and the intake port for delivering fluid from the intake port to a first side of the valve member adjacent the first sealing surface;
   a second channel in communication with the chamber and the intake port for delivering fluid from the intake port to a second side of the valve member adjacent the second sealing surface;
   a first switch located adjacent the intake port for selectively limiting fluid flow into the intake port; and
   a second switch located for selectively limiting fluid flow from the intake port to the second side of the valve member without limiting fluid from flowing to the first side of the valve member.

2. A fluid diverter valve as defined in claim 1 wherein the valve member comprises a disk.

3. A fluid diverter valve as defined in claim 1 wherein the valve member comprises a flexible diaphragm.

4. A fluid diverter valve as defined in claim 1 further comprising a spring located within the chamber in operative engagement with the valve member for biasing the valve member towards the first position.

5. A fluid diverter valve as defined in claim 4 wherein the spring moves the disk from the second position to the first position when the first switch is actuated to limit fluid flow into the intake port.

6. A fluid diverter valve as defined in claim 1 wherein the first switch limits fluid flow by partially preventing fluid flow for a predetermined time period.

7. A fluid diverter valve as defined in claim 1 wherein the first switch limits fluid flow by completely preventing fluid flow for a predetermined time period.

8. A fluid diverter valve as defined in claim 1 wherein a first fluid path is open when the valve member is in the first position, the first fluid path being defined by the intake port, the second channel, at least a portion of the chamber, and the second output port.

9. A fluid diverter valve as defined in claim 1 wherein a second fluid path is open when the valve member is in the second position, the second fluid path being defined by the intake port, the first channel, at least a portion of the chamber, and the first output port.

10. A fluid diverter valve as defined in claim 1 wherein, when the valve member is in the first position, closing the second switch causes pressure developed by fluid delivered to the first side of the valve member to move the valve member from the first position to the second position such that fluid flows from the intake port to the first output port.

11. A fluid diverter valve as defined in claim 1 wherein if a vacuum of sufficient magnitude is applied to the first output port, the valve member will move to the first position regardless of the positions of the first and second switches.

12. A fluid diverter valve as defined in claim 1 wherein, if a vacuum of sufficient magnitude is applied to the second output port, the valve member will move to the second position regardless of the positions of the first and second switches.

13. A fluid diverter valve comprising:
   a housing defining a chamber;
   an intake port;
   a first output port in communication with the chamber;
   a second output port in communication with the chamber, the second output port being located in substantial alignment with the first output port, the first and second output ports being centrally located on opposite sides of the chamber;
   a valve member disposed within the chamber for reciprocating movement between a first position wherein the valve member substantially prevents fluid from flowing through the first output port, and a second position wherein the valve member substantially prevents fluid from flowing through the second output port, the valve member having a center, the first and second output ports being disposed in substantial alignment with the center of the valve member;
   a first switch located for selectively limiting fluid flow from the intake port to the first side of the valve member without limiting fluid flow to a second side of the valve member; and
   a second switch located for selectively limiting fluid flow from the intake port to the second side of the valve member without limiting fluid from flowing to the first side of the valve member, whereby closing the second switch causes the valve member to move from the first position to the second position, and closing the first switch causes the valve member to move from the second position to the first position.

14. A fluid diverter valve as defined in claim 13 wherein the valve member comprises a disk.

15. A fluid diverter valve as defined in claim 13 wherein the valve member comprises a flexible diaphragm.

16. A fluid diverter valve as defined in claim 13 wherein the first switch limits fluid flow by partially preventing fluid flow for a predetermined time period.

17. A fluid diverter valve as defined in claim 13 wherein the first switch limits fluid flow by completely preventing fluid flow for a predetermined time period.

18. A fluid diverter valve as defined in claim 13 further comprising a spring located within the chamber in operative engagement with the valve member for biasing the valve member towards the first position.

19. An integral fluid diverter valve and vacuum break comprising:
   a housing defining a chamber;
   an intake port;
   a first output port in communication with the chamber;
   a second output port in communication with the chamber, the second output port being located in substantial alignment with the first output port, the first and second output ports being centrally located on opposite sides of the chamber;
   a valve member disposed within the chamber for reciprocating movement between a first position wherein the valve member substantially prevents fluid from flowing through the first output port, and a second position wherein the valve member substantially prevents fluid from flowing through the second output port, the valve member having a center, the first and second output ports being disposed in substantial alignment with the center of the valve member, the valve member being responsive to (a) fluid flow through a first opening in the chamber to move from the first position to the second position; (b) to the application of a vacuum having a magnitude greater than a first threshold to the second output port to move from the first position to the second position; (c) to fluid flow through a second opening in the chamber to move from the second position to the first position; and (d) to the application of a vacuum having a magnitude greater than a second threshold to the first output port to move from the second position to the first position;
   a switch located between the intake port and the chamber for selectively limiting fluid flow from the intake port to a side of the valve member adjacent the first output port.

20. An apparatus as defined in claim 19 wherein the first threshold is different from the second threshold.

21. An apparatus as defined in claim 19 wherein the first threshold is the same as the second threshold.

22. A fluid diverter valve as defined in claim 19 wherein the valve member comprises a disk.

23. A fluid diverter valve as defined in claim 19 wherein the valve member comprises a flexible diaphragm.

24. A fluid diverter valve comprising:
   a housing defining a chamber;
   an intake port;
   a first output port in communication with the chamber;
   a second output port in communication with the chamber;
   an unbiased valve member having a variable at-rest position and being isolated from engagement with elements external to the housing, the valve member being disposed within the chamber for reciprocating movement between a first position wherein the valve member substantially prevents fluid from flowing through the first output port, and a second position wherein the valve member substantially prevents fluid from flowing through the second output port; and
   a switch located between the intake port and the chamber for selectively limiting fluid flow from the intake port to a side of the valve member adjacent the first output port.

25. A fluid diverter valve as defined in claim 1 wherein the valve member has a variable at-rest position.

26. A fluid diverter valve as defined in claim 1 further comprising a first annular chamber in communication with the first channel and the chamber.

27. A fluid diverter valve as defined in claim 26 further comprising a second annular chamber in communication with the second channel and the chamber.

28. A fluid diverter valve as defined in claim 13 wherein the valve member has a variable at-rest position.

29. A fluid diverter valve as defined in claim 13 further comprising a first annular chamber in communication with the chamber and the intake port.

30. A fluid diverter valve as defined in claim 29 further comprising a second annular chamber in communication with the chamber and the intake port.

31. A fluid diverter valve as defined in claim 19 wherein the valve member has a variable at-rest position.

32. A fluid diverter valve as defined in claim 19 further comprising a first annular chamber in communication with the chamber and the intake port.

33. A fluid diverter valve as defined in claim 32 further comprising a second annular chamber in communication with the chamber and the intake port.

34. A fluid diverter valve as defined in claim 24 wherein the valve member has a variable at-rest position.

35. A fluid diverter valve as defined in claim 24 further comprising a first annular chamber in communication with the chamber and the intake port.

36. A fluid diverter valve as defined in claim 35 further comprising a second annular chamber in communication with the chamber and the intake port.

37. A fluid diverter valve comprising:
   a housing defining a chamber;
   an intake port;
   a first output port in communication with the chamber;
   a second output port in communication with the chamber;
   a diaphragm disposed within the chamber for reciprocating movement between a first position wherein the diaphragm substantially prevents fluid from flowing through the first output port, and a second position wherein the diaphragm substantially prevents fluid from flowing through the second output port, the diaphragm having an at-rest position, located between the first position and the second position; and
   a switch located between the intake port and the chamber for selectively limiting fluid flow from the intake port to a side of the diaphragm adjacent the first output port.

38. A fluid diverter valve comprising:
   a housing defining a chamber;
   an intake port in communication with the chamber via first and second openings, the first opening being defined in a first side of the chamber, the second opening being defined in a second side of the chamber opposite the first side;

a first output port in communication with the chamber via a third opening, the third opening being substantially centrally located with respect to the first opening;

a second output port in communication with the chamber via a fourth opening, the fourth opening being substantially centrally located with respect to the second opening;

a valve member disposed within the chamber for reciprocating movement between a first position wherein the valve member substantially prevents fluid from flowing through the first output port, and a second position wherein the valve member substantially prevents fluid from flowing through the second output port, the valve member having an at-rest position located between the first position and the second position; and a switch located between the intake port and the chamber for selectively limiting fluid flow from the intake port to a side of the valve member adjacent the first output port.

* * * * *